UNITED STATES PATENT OFFICE.

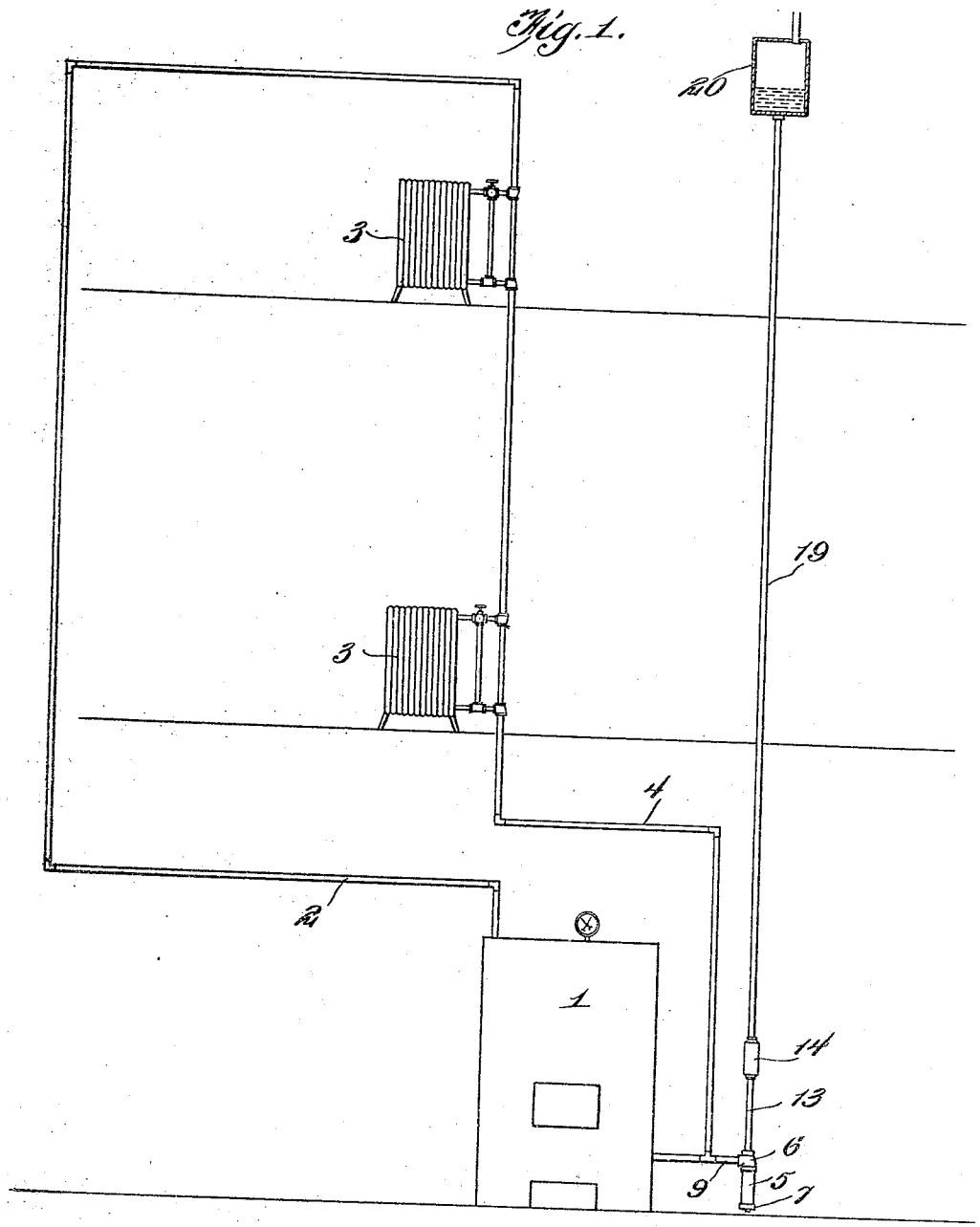

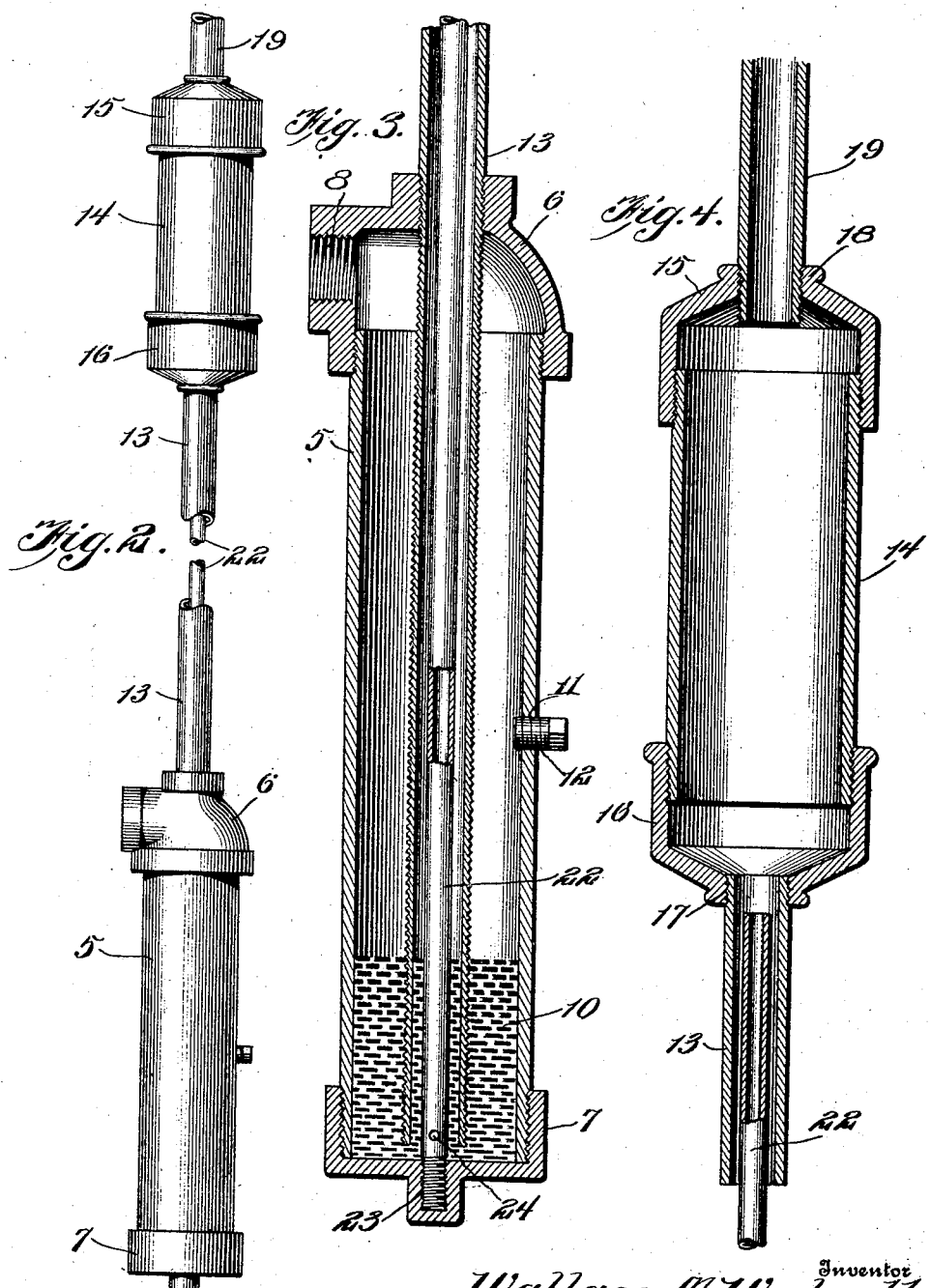

WALLACE M. WALCUTT, OF COLUMBUS, OHIO.

PRESSURE-REGULATOR FOR WATER-HEATING SYSTEMS.

No. 907,545.  Specification of Letters Patent.  Patented Dec. 22, 1908.

Application filed April 17, 1908. Serial No. 427,624.

*To all whom it may concern:*

Be it known that I, WALLACE M. WALCUTT, a citizen of the United States, residing at Columbus, in the county of Franklin and State of Ohio, have invented new and useful Improvements in Pressure-Regulators for Water-Heating Systems, of which the following is a specification.

This invention relates to an automatic pressure regulator for hot-water heating-systems for maintaining the water in the system under a constant and uniform pressure so as to facilitate and accelerate its flow or circulation through the system, and for relieving the system of excess pressure to prevent the generation of steam and insure safety under all conditions of service.

The object of the invention is to provide a pressure regulator of the mercury seal type which is simple of construction, reliable and efficient in use and comparatively inexpensive of production, and which, instead of acting simply as a relief device, as does other devices of its nature, is so constructed and arranged in the system as to not only operate as a relief or expansion device, but also as a direct pressure producer serving to force the water through the system to increase the circulation and efficiency of the system.

With these and other ends in view, the invention consists of the features of construction, combination and arrangement of parts hereinafter fully described and claimed, reference being had to the accompanying drawings, in which:—

Figure 1 is a side elevation, showing the device in use in a heating system. Fig. 2 is a side view of the pressure regulator on an enlarged scale, with parts broken away and the tank omitted. Fig. 3 is a vertical section through the pressure chamber. Fig. 4 is a similar view of the expansion chamber and connecting parts.

Referring to the drawings, the numeral 1 designates the water-heater of the apparatus, which may be of any preferred construction, and from which extends the riser or flow pipe 2 leading to the radiators 3 on the respective floors of the building, from which a return pipe 4 conducts the water back to the heater.

The pressure regulator is arranged at a point adjacent the water-heater and comprises a pressure chamber 5 shown in the form of a cylinder open at each end and closed at its upper and lower ends by threaded caps 6 and 7, the former having an internally threaded inlet 8 for the reception of a pipe 9 communicating with the return pipe 4 and the lower portion of the water-heater.

The lower portion of the chamber 5 forms a receptacle for a suitable quantity of mercury 10, and is provided above the same with a threaded opening 11 through which the mercury may be introduced and discharged, said opening being normally closed by a screw plug 12. In threaded engagement with the cap 6 and extending downwardly into the pressure chamber is a stand pipe or tube 13, the lower end of which is immersed in the body of mercury 10 and terminates a short distance above the bottom of the cap 7, and is open for the circulation between the same and the pressure chamber of the mercury, which normally stands at the level indicated by the line $x$—$x$ in Fig. 3.

The pipe or tube 13 extends upwardly from the pressure chamber and communicates at a suitable elevation thereabove with the lower end of an expansion chamber 14, comprising a cylinder closed at its upper and lower end by threaded caps 15 and 16, the lower cap being formed with a threaded nipple 17 to receive the upper threaded end of the pipe 13, while the upper cap is provided with a threaded nipple 18 to receive the lower end of a pipe 19 extending up to and connecting the expansion chamber with an expansion tank 20 located above the highest radiator in the system, as in the attic or upper story of a building. The pipe 20 constitutes a stand pipe for the reception of a body or column of water 21, acting as a balancing column upon the column of mercury to maintain a desired pressure on the water in the system. This balancing column of water may extend the entire length of the pipe and partially fill the expansion tank, which is open at the top to the atmosphere for the escape of the water under abnormal conditions and to consequently insure absolute safety in the action of the apparatus.

Centered within the tube or pipe 13 is a tube or pipe 22, which is spaced from said pipe 13 to leave an intervening channel or space for the movement of the mercury therein, the lower end of said tube 22 being threaded to engage a threaded boss or socket 23 formed on the cap 7, whereby such lower end of the tube is also closed from communication with the pressure chamber. In said tube at a point at a little higher level than the lower open end of the tube 13 is formed a restricted lateral port or inlet 24, for the circulation of the mercury to and through the tube 22, which latter terminates at its upper end below the level of the upper end of the pipe 13, below the cap 16 of the separating chamber 14.

In practice, the expansion chamber 14 is disposed a little above the level or height to which the column of mercury rises in the tubes 13 and 22 when expanded to a maximum extent, and its purpose is to provide a receptacle of increased area for the flow of water from the system therein when the pressure in the system passes beyond the normal maximum point, so as to give immediate relief for reducing the pressure to the normal working limit, while the pipe 19 varies in height according to the height of the building so that the balancing column will have sufficient static pressure to normally balance or support the desired pressure in the system.

In the operation of the apparatus the ordinary expansion in the system will force the mercury upwardly into the tubes 13 and 22, whereby the static column will be elevated and the mercury column thus formed operate in conjunction therewith to place the water in the system under pressure, thus permitting the water to be raised to a temperature exceeding the boiling point without generating steam. During the fluctuation of the pressure incident to the operation of the system, the mercury level in the tubes will vary more or less according to the temperature condition, but when the apparatus is operating at normal temperature the weight of the column will maintain a normal pressure in the system. When, owing to a reduction of temperature, the water in the system contracts, the mercury level in the tubes will be lowered, the mercury returning to the pressure chamber where it resumes its normal level. If, during the operation of the apparatus, the temperature and pressure should increase to such an extent as to bring the water to a boiling point, the mercury will flow upward into the tubes to the maximum height, the water displaced from the system by expansion passing into the tube 22 through the port 24, when the mercury level descends to a point below said port and forcing the mercury out at the top of tube 22, the water discharging into the expansion chamber 14, whereby instant relief is afforded to restore the pressure in the system to normal condition. The mercury forced out at the top of the tube 22 flows over the same and down through the tube 13 finally back to the pressure chamber, while upon the relief of pressure in the system afforded in the manner described the mercury descends in the tube 13 to the normal level indicated in Fig. 3. Under excess expansion the water rises in the expansion tank, which, being open, will permit a portion of the water to discharge therefrom should a dangerous condition arise, thus enabling a quick reduction of pressure to be obtained and insuring absolute safety in the operation of the apparatus under all conditions. As the upper end of the tube 22 terminates below the upper end of the tube 13, the mercury forced out of said tube 22 flows over the upper edge thereof into the tube 13 and is thereby prevented from discharging with the water into the expansion chamber 14, thus insuring the return of all of the mercury to the pressure chamber 5 and obviating the necessity of employing deflectors or baffle plates within the expansion chamber 14 to prevent the mercury from being forced thereinto by the water and carried by the latter into the pipe 19 and thence to the expansion tank 20.

Through the operation of the apparatus the cooled water from the radiators flowing back through the return pipe is forced under pressure into the lower portion of the boiler against the hot water in the top of the boiler, thus driving the latter out into the system and increasing the circulation and rapidity of flow of the water to a large extent, so that the area of the circulating pipes may be decreased without disadvantage and with an attendant saving in the cost of installing heating systems of this character.

Having thus fully described the invention, what is claimed as new is:—

1. In a water heating system, a water-heater, radiators, a flow pipe leading from the heater to the radiators, a return pipe, a pressure chamber communicating with the boiler and independently of the latter with the return pipe and having a body of mercury therein, an outer tube immersed at its lower end in the body of mercury, an expansion chamber in communication with the upper end of said tube, an interior tube immersed at its lower end in the body of mercury and having an inlet above the inlet of the outer tube, and terminating at its upper end below the upper end of the latter, an expansion tank, and a pipe connecting the expansion chamber with said expansion tank.

2. A pressure regulator for hot water heating systems, comprising a closed pressure chamber adapted for communicative connection with the heating system, said chamber containing a mercury bath, an outer tube immersed at its lower end in said bath and extending exteriorly of said chamber and adapted for connection at its upper end with a relief chamber, and an inner tube disposed in spaced relation in said outer tube and having its lower end immersed in the bath and terminating at its upper end below the upper end of the other tube.

3. A pressure regulator for hot water heating systems, comprising a closed pressure chamber adapted for communicative connection with the heating system, said chamber containing a mercury bath, an outer tube immersed at its lower end in said bath and extending exteriorly of said chamber and adapted for connection at its upper end with a relief chamber, and an inner tube disposed in spaced relation within said outer tube and having its lower end immersed in the bath and provided with a lateral inlet above the inlet of said outer tube.

4. A pressure regulator for hot water heating systems, comprising a closed pressure chamber adapted for communicative connection with the heating system, said chamber containing a mercury bath, an outer tube having a lower open end immersed in said bath and having its upper end extending exteriorly of said chamber and adapted for connection with a relief chamber, and an inner tube disposed in spaced relation within said outer tube and having its lower end immersed in the bath and provided with a lateral inlet located above the level of the lower open end of the outer tube.

5. A pressure regulator for hot water heating systems, comprising a closed pressure chamber adapted for communicative connection with the heating system, said chamber containing a mercury bath, an outer tube having an inlet at its lower end immersed in said bath and extending at its upper end exteriorly of the chamber and adapted for connection with a relief chamber, and an inner tube having its lower end immersed in the bath and provided with a lateral inlet located above the inlet of the outer tube, and having its upper end terminating below the upper end of said outer tube.

6. A pressure regulator for hot water heating systems, comprising a closed pressure chamber adapted for communicative connection with the heating system, said chamber containing a mercury bath, an outer tube having a lower open end immersed in said bath and having its upper end extending exteriorly from said chamber and adapted for connection with a relief chamber, and an inner tube disposed in spaced relation within said outer tube and having its lower end immersed in the bath and provided with a lateral inlet located above the level of the open end of the outer tube, and having at its upper end terminating below the upper end of said outer tube.

7. A pressure regulator for hot water heating systems, comprising a closed pressure chamber adapted for communicative connection with the heating system, said chamber containing a mercury bath, and inner and outer tubes disposed in spaced relation within said chamber and having inlets at different levels at their lower ends immersed in said bath, the upper ends of said tubes extending exteriorly of the chamber, and the upper end of the outer tube extending above the outer end of the inner tube and being adapted for connection with a relief chamber.

8. A pressure regulator for hot water heating systems, comprising a closed pressure chamber containing a mercury bath, means for admitting fluid pressure to said chamber against one side of the bath, inner and outer tubes disposed in spaced relation and immersed at their lower ends in the bath and one having an inlet below the level of the other, said tubes extending exteriorly at their upper ends from said pressure chamber with the upper end of the inner tube terminating below the upper end of the outer tube, a relief chamber communicating with the upper end of the outer tube, and an expansion tank above and in communication with said relief chamber.

9. A pressure regulator comprising a pressure chamber having a body of mercury inclosed therein at its lower end and provided at its upper end with an inlet, an expansion chamber disposed above said pressure chamber, an outer tube communicating at its upper end with the expansion chamber and extending longitudinally within the pressure chamber and submerged at its lower end in the mercury in the latter, and an inner tube extending longitudinally through said outer tube and terminating at its upper end below the upper end of said outer tube, the lower end of said inner tube being submerged in the mercury in the pressure chamber and provided with a lateral inlet located above the level of the lower inlet end of the outer tube.

In testimony whereof I affix my signature in presence of two witnesses.

WALLACE M. WALCUTT.

Witnesses:
C. C. HINES,
RUTH BREDEKAMP.